Patented Dec. 4, 1951

2,576,937

UNITED STATES PATENT OFFICE 2,576,937

3-SUBSTITUTED-22-MONOPHENYL-BISNOR-5,20-CHOLADIENES AND PRODUCTION OF PREGNENOLONE THEREFROM

Frederick W. Heyl and Milton E. Herr, Kalamazoo, Mich., and Albert P. Centolella, Elkhart, Ind., assignors to The Upjohn Company, Kalamazoo, Mich., a corporation of Michigan No Drawing. Application December 4, 1948, Serial No. 63,617

7 Claims. (Cl. 260—397.5)

This invention relates to substitution derivatives of 22-aryl-bisnor-5,20:22-choladienes, particularly to substitution derivatives wherein the substituent is joined to the carbon atom in the 3-position of the choladiene nucleus through an oxygen atom. In one of its more specific embodiments, the compounds of the invention are 3 - substituted - 22 - aryl - bisnor - 5,20:22-choladienes wherein the substituent on the carbon atom in the 3-position is a hydroxyl radical, and ethers and esters thereof, which may be represented by the general formula:

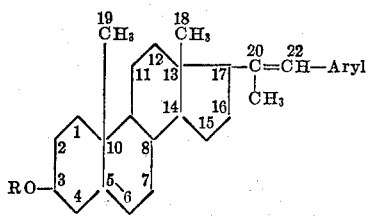

in which R is a member of the group consisting of hydrogen, alkyl and acyl radicals.

Members of the new class of 3-substituted-22-aryl-bisnor-5,20:22-choladienes are of value as intermediates in the preparation of pregnenolone and its derivatives by oxidation of the 20:22 double bond with ozone or chromium trioxide as originally described and claimed in our copending application Serial 63,618, filed on even date herewith, which is now abandoned, and as now described hereinafter and claimed herein.

While this invention is described with particular reference to those compounds wherein the aryl group is phenyl, it is to be understood that methoxyphenyl, alpha-naphthyl, beta-naphthyl, methoxy-naphthyl and others, are likewise within the scope of this invention.

The dehydration of side-chain tertiary steroid alcohols in which two aromatic radicals are attached to the carbon atom to which the tertiary carbinol group is attached is known to take place readily. However, the dehydration of side-chain secondary steroid alcohols in which but one aromatic group is attached to the carbon atom does not take place readily when many of the common dehydrating agents are used, such as thionyl chloride in pyridine (Darzen's method), phosphorus oxychloride, concentrated sulfuric acid, activated alumina and para-toluenesulfonic acid. We have discovered, however, that the dehydration of side-chain secondary steroid alcohols to produce the compounds of the present invention can be carried out by using para-toluenesulfonic acid in the presence of phenol, or preferably by heating the alcohol to from 150–200 degrees centigrade in the presence of anhydrous oxalic acid and an inert solvent. The dehydration of steroid alcohols in which but one aromatic ring is attached to the carbon carrying a hydroxyl group is more fully described and claimed in the copending application of George B. Spero, Robert H. Levin, and Frederick W. Heyl, Serial 63,615, filed on even date herewith.

The 3-substituted-22-hydroxy-22-aryl-bisnor-5-cholenes from which the compounds of this invention can be obtained are prepared readily by the method of F. W. Heyl, A. P. Centolella, and M. E. Herr [J. Am. Chem. Soc. 69, 1960 (1947)] by reacting an arylmagnesium halide and a 3-substituted-bisnor-5-cholenaldehyde, decomposing the complex formed, and isolating the resulting 3-substituted-22-hydroxy-22-aryl-bisnor-5-cholene. The preparation of 3-methoxy - 22 - phenyl - 22 - hydroxy - bisnor - 5 - cholene and 3 - benzoyloxy - 22 - phenyl - 22 - hydroxy-bisnor-5-cholene by such method are described under the heading of Preparations hereinafter.

Compounds contemplated by the invention which can be prepared by the methods given include, among others, 3-hydroxy-22-phenyl-bisnor-5,20-choladiene, 3-acetoxy - 22 - phenyl-bisnor-5,20-choladiene, 3-propoxy-22-p-methoxyphenyl-bisnor-5,20-choladiene, 3-isovaleroxy-22-phenyl-bisnor-5,20-choladiene, 4-cyclohexoyloxy-22 - alpha-naphthyl-bisnor - 5,20 - choladiene, 3-sec. - butyryloxy - 22 - phenyl-bisnor-5,20-choladiene, 3 - benzoyloxy - 22 - phenyl-bisnor - 5,20-choladiene, 3-phenylacetoxy - 22 - phenyl-bisnor-5,20-choladiene, 3-methoxy - 22 - phenyl-bisnor-5,20-choladiene, 3-sec.-butoxy-22-phenyl-bisnor-5,20-choladiene, and 3-benzyloxy-22-phenyl-bisnor-5,20-choladiene.

Certain advantages of the invention are apparent from the following examples which are given by way of illustration only and are not to be construed as limiting.

EXAMPLE 1.—3(beta)-hydroxy-22-phenyl-bisnor-5,20:22-choladiene

One gram of 3(beta),22-dihydroxy-22-phenyl-bisnor-5-cholene, which is also known as 22-phenyl-3-hydroxy-bisnor-5-cholenol [F. W. Heyl, A. P. Centolella, and M. E. Herr, J. Am. Chem. Soc. 69, 1960 (1947)], 4.0 grams of anhydrous oxalic acid and 40 milliliters of a mixture of diphenyl and diphenyl oxide (Dowtherm A) were mixed and heated under reflux for ninety minutes. The mixture was cooled, diluted with 100 milliliters of ether and washed with water. The ethereal solution was steam-distilled to remove the diphenyl and diphenyl ether. The aqueous residue on cooling was extracted with ether. The ether solution was dried, the ether removed, and the residue crystallized from isopropyl ether. There was thus obtained 0.21 gram of 3(beta)-hydroxy-22-phenyl-bisnor-5,20:22-choladiene melting at 180–188 degrees centigrade. After crystallization from acetone, the product melted at 184–187 degrees centigrade.

When the 3(beta)-hydroxy-22-phenyl-bisnor-5,20:22-choladiene melting at 184–187 degrees centigrade was shaken at room temperature with methanolic potassium hydroxide a diastereoisomer is obtained melting at 149.5–151.5 degrees centigrade. Chromatography over aluminum oxide also converted the high melting isomer into the low melting form.

When dehydrated in a like manner, 3,22-dihydroxy-22-alpha-naphthyl-bisnor-5-cholene yields 3-hydroxy-22-alpha-naphthyl-bisnor-5,20:22-choladiene.

EXAMPLE 2.—*3 - acetoxy - 22 - phenyl - bisnor-5,20:22-choladiene*

A solution of 0.31 gram of 3-hydroxy-22-phenyl-bisnor-5,20:22-choladiene (M. P. 149.5–151.5 degrees centigrade prepared as described in Example 1) in a mixture of five milliliters of pyridine and five milliliters of acetic anhydride was heated on a steam bath to about 90 degrees centigrade for one and one-half hours. Upon cooling, the solution was poured into ice water and the resulting solid precipitate separated and washed with water. The solid was crystallized from methanol, yielding 0.2 gram of 3-acetoxy-22-phenyl-bisnor-5,20:22-choladiene melting at 150–156 degrees centigrade. Further crystallization from methanol gave a product melting at 158.5–160.5 degrees centigrade. Its percentage analysis was as follows:

Calculated for $C_{30}H_{40}O_2$__ C 83.28  H 9.32  $CH_3CO$ 9.95
Found_____ 82.94     9.18          10.28

EXAMPLE 3. — *3-propionoxy-22-phenyl-bisnor-5,20:22-choladiene*

In a manner similar to that described in Example 2, using propionic anhydride, 3-propionoxy-22-phenyl-bisnor-5,20:22-choladiene is obtained.

EXAMPLE 4.—*3-butyroxy - 22 - phenyl - bisnor-5,20:22-choladiene*

In a manner similar to that described in Example 2, using butyric anhydride, 3-butyroxy-22-phenyl-bisnor-5,20:22-choladiene is obtained.

*Preparing 1.—3 - methoxy - 22 - phenyl - 22 - hydroxy-bisnor-5-cholene*

Three and one-tenth grams of 3-methoxy-bisnor-5-cholenaldehyde [A. P. Centolella, F. W. Heyl, and M. E. Herr, J. Am. Chem. Soc. 69, 2953 (1948)] dissolved in fifty milliliters of benzene was added to a solution of phenylmagnesium bromide prepared from 1.5 grams of bromobenzene and magnesium. The solution of the phenylmagnesium bromide was heated under reflux during the addition of the aldehyde and for an additional one and one-half hours thereafter. The cooled reaction mixture was poured onto a mixture of ice and water containing 100 grams of ammonium chloride. The resulting suspension was extracted with four 150 milliliter portions of chloroform. The combined chloroform extracts were washed with water, five percent hydrochloric acid and water; the chloroform was then removed and the residue steam-distilled. The residual solids were collected and washed with ether. There was thus obtained 2.6 grams of 3 - methoxy - 22 - phenyl-22-hydroxy-bisnor - 5-cholene (22-phenyl-3-methoxy - bisnor-5-cholenol) having a melting point of 200–202 degrees centigrade. Crystallization from a mixture of methanol and chloroform gave a pure product melting at 207–208 degrees centigrade. Its percentage analysis was as follows:

Calculated for $C_{29}H_{42}$_____C 82.43   H 10.02
Found _____ 82.36       9.90

*Preparation 2. — 3 - benzyloxy-22-phenyl-22-hydroxy-bisnor-5-cholene*

In a manner similar to that described in Preparation 1, there was obtained from 0.56 gram of 3-benzyloxy-bisnor-5-cholenaldehyde and phenylmagnesium bromide 0.34 gram of 3-benzyloxy-22-phenyl-22-hydroxy-bisnor-5-cholene melting, after crystallization from a mixture of methanol and chloroform, at 203–204 degrees centigrade. Its percentage analysis was as follows:

Calculated for $C_{35}H_{46}O_2$_____C 84.28   H 9.30
Found _____ 84.34       9.47

EXAMPLE 5.—*3-methoxy - 22 - phenyl - bisnor-5,20:22-choladiene*

A solution of 0.5 gram of 3-methoxy-22-phenyl-22-hydroxy-bisnor-5-cholene [A. P. Centolella, F. W. Heyl, and M. E. Herr, J. Am. Chem. Soc., 70, 2954 (1948), which is described in Preparation 1 herein], 0.02 gram of phenol and 0.05 gram of p-toluenesulfonic acid monohydrate dissolved in 200 milliliters of toluene was heated under reflux using a water trap for eighteen hours. After cooling, the solution was washed until neutral with five percent sodium hydroxide solution and water and the toluene was then removed under reduced pressure. The crystalline residue was dissolved in fifty milliliters of benzene and the benzene solution passed over a column of fifteen grams of activated alumina (Fisher Adsorption). The product which was adsorbed on the alumina was eluted by passing through the column successive 40 milliliter portions of anhydrous benzene. The first four portions of the eluate were combined and, on removal of the solvent, gave 370 milligrams of crystalline 3-methoxy-22-phenyl-bisnor-5,20:22-choladiene which melted at 166–169 degrees centigrade after crystallization from a mixture of methanol and chloroform. Its percentage analysis was as follows:

Calculated for $C_{29}H_{20}O$_____C 86.11   H 9.97
Found _____ 86.45       10.47

EXAMPLE 6.—*3-benzyloxy-22-phenyl-bisnor-5,20:22-choladiene*

When dehydrated in a manner similar to that described in Example 5, 3-benzyloxy-22-hydroxy-22-phenyl-bisnor - 5 - cholene (Preparation 2) yields 3-benzyloxy - 22 - phenyl-bisnor - 5,20:22-choladiene.

The use of the compounds of the present invention as intermediates for the production of pregnenolone and its derivatives is exemplified in the examples which follow hereinafter.

EXAMPLE 7.—*Methyl ether of pregnen-3 (beta)-ol-20-one*

To a solution of 400 milligrams of 3-methoxy-22-phenyl-bisnor-5,20:22 choladiene (prepared as described in Example 5) dissolved in 25 milliliters of chloroform, cooled to five degrees centigrade, there was added dropwise a solution of 158 milligrams of bromine in five milliliters of chloroform. The resulting solution of 3-methoxy-5,6-dibromo-22-phenyl-bisnor-20-cholene in chloroform was ozonized by bubbling into the solution cooled to five degrees about 7.2 milligrams of ozone per minute for 30 minutes. The solvent was then removed under reduced pressure at a temperature below 30 degrees and the residue dissolved in 20 milliliters of glacial acetic acid. One-half gram of zinc dust was carefully added to the acetic acid to decompose the ozonide and remove the bromine and the resulting product was extracted with ether. The ethereal solution was washed with five-percent sodium hydroxide solution and water until neutral, dried and the ether removed. There was thus obtained 340 milligrams of an oil which was heated under reflux with 30 milliliters of methanol, three milliliters of water, 0.4 gram of semicarbazide hydrochloride and 0.4 gram of sodium acetate for one hour. On cooling, the semicarbazone of the 3-methoxy-pregnen-20-one separated and, after crystallization from methanol-chloroform mixture, had a melting point of 235–237 degrees centigrade. Its percentage analysis was as follows:

Calculated for $C_{23}H_{37}O_2N_3$ _____ N 10.84
Found _____ 10.76

A mixed melting point with a sample of the semicarbazone prepared from the methyl ether of pregnen-2(beta)-ol-20-one by the method of Butenandt and Gross, Ber. 70, 1448 (1937), showed no depression.

A solution of 240 milligrams of the above semicarbazone in 50 milliliters of methanol containing 25 milliliters of 5-normal sulfuric acid was heated under reflux for one-half hour. The solution was diluted with water, extracted with ether, the ethereal solution washed with water until neutral and dried. On removal of the ether, 192 milligrams of pregnen-3(beta)-ol-20-one methyl ether was obtained which, after crystallization from dilute acetone, had a melting point of 124–125 degree centigrade. A mixed melting point with a known sample of pregnen-3(beta)-ol-20-one methyl ether showed no depression. Its percentage analysis was as follows:

Calculated for $C_{22}H_{34}O_2$ _____ C 79.94   H 10.37
Found _____ 79.68        10.45

EXAMPLE 8.—*Benzyl ether of pregnen-3(beta)-ol-20-one*

In a manner similar to that described in Example 7, 3-benzyloxy-22-phenyl-bisnor-5,20:22-choladiene (Example 6) yields the corresponding pregnenolone benzyl ether.

EXAMPLE 9.—*Pregnen-3(beta)-ol-20-one acetate*

To a solution of 135 milligrams of 3-acetoxy-22-phenyl-bisnor-5,20:22-choladiene (Example 2) dissolved in 15 milliliters of chloroform cooled to zero degrees centigrade was added dropwise 50 milligrams of bromine dissolved in five milliliters of chloroform over a period of 15 minutes. Ozonized oxygen was now passed into the cooled solution (which now contains 3-acetoxy-22-phenyl-bisnor-5,6-dibromo-20-cholene), at a rate of 13.7 milligrams of ozone per minute while the temperature was maintained at zero degrees centigrade until about six molar equivalents of ozone had been added; this required about eight minutes. The solution was then evaporated to dryness under a nitrogen atmosphere and the residual ozonide decomposed by warming to 80–95 degrees centigrade with an excess of zinc dust suspended in ten milliliters of glacial acetic acid. The solution was cooled, the excess zinc removed by filtration and the cooled filtrate poured into 75 milliliters of water. The aqueous solution was extracted with ether, the ether extract washed successively with one-percent sodium hydroxide solution and water and was then dried. The solid residue was dissolved in benzene and chromatographed over acid-washed alumina, the chromatogram being developed with benzene containing from 0.4 to 4.0 percent methanol. On evaporation of the solvent and crystallization of the solid residue from an acetone-water mixture, 30 milligrams of pregnenolone acetate melting at 142–144 degrees centigrade was obtained; this product when mixed with an authentic sample, showed no melting point depression.

Inasmuch as the foregoing specification comprises preferred embodiments of the invention, it is to be understood that the invention is not limited thereto and that modifications and variations may be made therein in conventional manner without departing from the invention, which is to be limited solely by the scope of the appended claims.

We claim:
1. 22-monophenyl-bisnor - 5,20:22 - choladiene represented by the general formula:

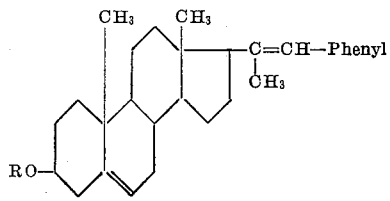

in which R is a member of the group consisting of hydrogen, methyl and acetyl radicals.

2. 3 - hydroxy-22-mono-phenyl-bisnor-5,20:22-choladiene.

3. 3-methoxy-22-mono-phenyl-bisnor-5,20:22-choladiene.

4. 3 - acetoxy-22-mono-phenyl-bisnor-5,20:22-choladiene.

5. A 22 - mono-phenyl-bisnor-5,20:22-choladiene.

6. A process for the preparation of the methyl ether of pregnen-3(beta)-ol-20-one which comprises the bromination of a solution of 3-methoxy - 22-mono-phenyl-bisnor-5,20:22-choladiene, oxidation with an excess of ozone of the 20:22 double bond of the resulting 3-methoxy-5,6-dibromo-22-mono-phenyl-bisnor-20-cholene to a 20-keto group, dehalogenation of the resulting compound with zinc metal and recovery of the methyl ether of pregnen-3(beta)-ol-20-one.

7. A process for the preparation of pregnen-3(beta)-ol-20-one acetate which comprises the bromination of 3-acetoxy-22-mono-phenyl-bisnor-5,20:22-choladiene, oxidation with an excess of ozone of the 20:22 double bond of the resulting 3-acetoxy-5,6-dibromo-22-mono-phenyl-bisnor-20-cholene to a 20-keto group, dehalogenation of the resulting compound with zinc metal and recovery of the pregnen-3(beta)-ol-20-one acetate.

FREDERICK W. HEYL.
MILTON E. HERR.
ALBERT P. CENTOLELLA.

REFERENCES CITED

The following references are of record in the file of this patent:

Riegel et al., Jour. Am. Chem. Soc. 68, 1097–1099 (1946).